July 2, 1974 R. RULLIER 3,822,172
DOUBLE GLAZING UNIT BONDED TOGETHER BY A BLEND OF RESINS
Filed Dec. 14, 1972
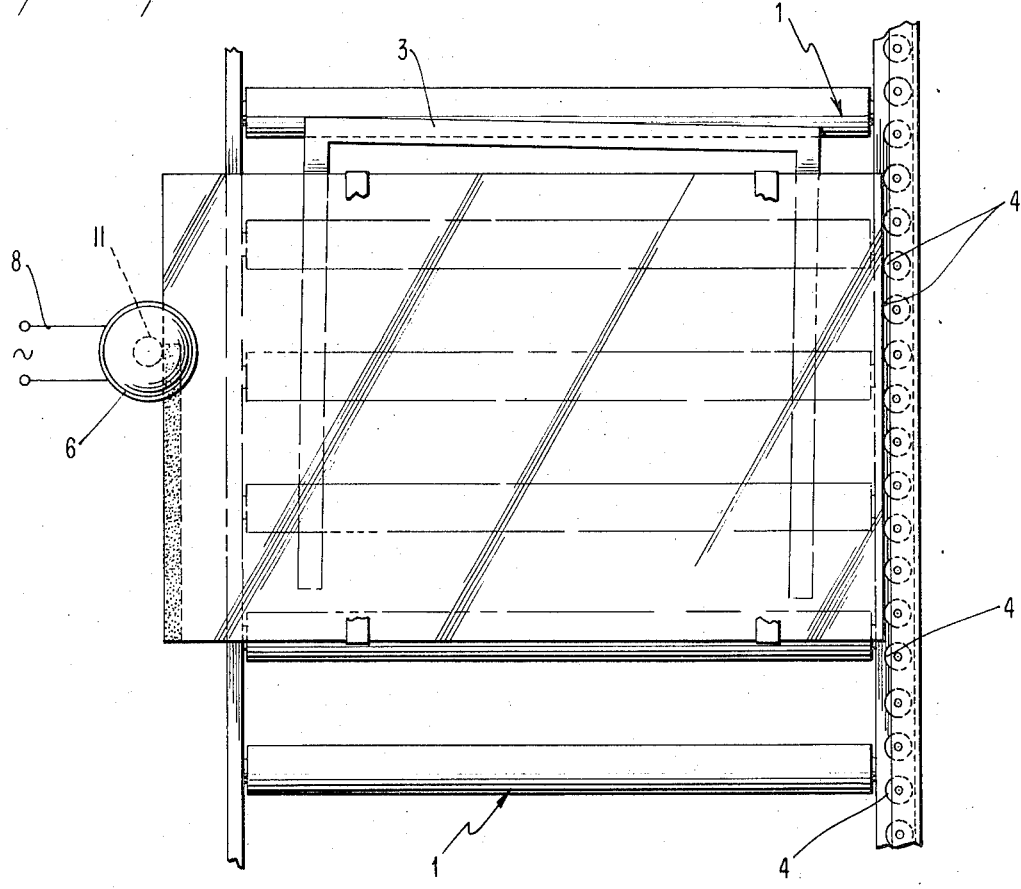
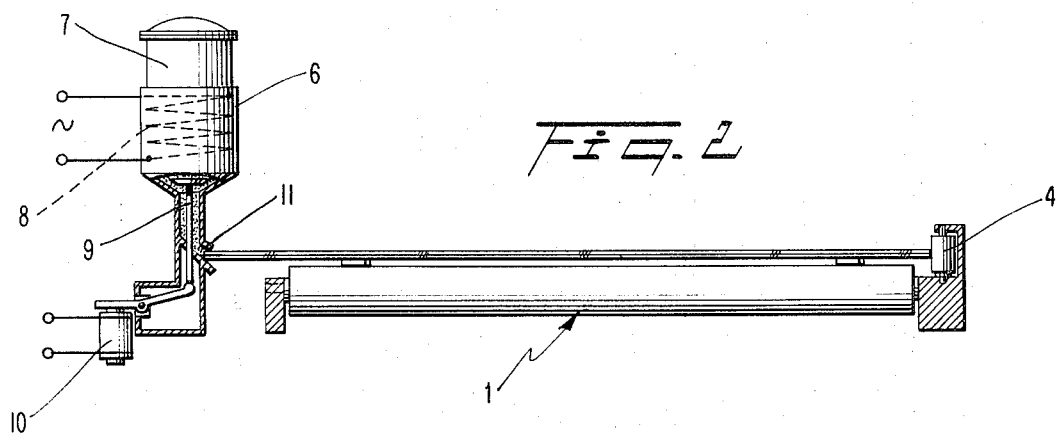

United States Patent Office 3,822,172
Patented July 2, 1974

3,822,172
DOUBLE GLAZING UNIT BONDED TOGETHER
BY A BLEND OF RESINS
Robert Rullier, Paris, France, assignor to Saint Gobain Industries, Neuilly-sur-Seine, France
Filed Dec. 14, 1972, Ser. No. 314,919
Claims priority, application France, Dec. 16, 1971, 7145236
Int. Cl. B32b 1/04, 17/10; C03c 27/10; C08f 15/00; E06b 3/24
U.S. Cl. 161—45                                6 Claims

ABSTRACT OF THE DISCLOSURE

A panel in the form of a double glazing unit having two sheets of glass spaced in parallel relation and sealed to form a cavity, and bonded together by a blend of resins having good adhesion to the glass and a compatible coefficient of expansion, said blend containing as primary ingredients an ionomer resin and a terpene ester, such as colophony ester and which may include additionally a butyl rubber or polyisobutylene and ethylene-vinyl copolymer, together with adjuvants including an antioxidant and an utra violet filter agent and a filler. A method of making the laminate by applying the blend of resins to the glass is included. The blend of resins is also disclosed.

---

This application relates to improvements in the art of forming double glazing units comprising two separate sheets of glass joined together at their edges to form a sealed unit with an insulating space between the sheets.

The method of making such units by soldering metal pieces directly to the periphery of the glass sheets is known. The technique has led to the production of excellent double windows, but the process is expensive and the product is often injured as the joint between the glass and metal is weak and the glass and metal have different coefficients of expansion.

Attempts have been made to form these double panes of glass by using a glued joint. In one proposed process the glued joint is arranged to maintain the spacing between the sheets. This process requires the material to be firm when applied in the form of a putty. However, the materials proposed have lacked the necessary properties of having a good adherence to the glass and being water-resistant. The materials which have been used in the past which had good adherence to the glass and good water resistance would not maintain the gap between the sheets, but would collapse if applied in such thickness to maintain a desirable separation of the sheets. It has been necessary to space the glass sheets by only a small distance so that the thermal insulation values were lost. Only by forming a laminate having three sheets of glass could the desired insulating values be obtained. This added to the cost and increased the weight of the units.

Another proposal was to form the double panel of glass which would have sufficient water tightness and resistance to cracking by making a joint in the form of a composite structure in which one element would serve to space the glass and another element would impart the necessary water resistance. In one example the sheets were spaced apart by means of a strand of material between the glass and the edges sealed with either a silicone resin or a polysulfide resin. The cord would have sufficient rigidity to maintain the sheets in spaced relation while the resins polymerized. This was time consuming and often resulted in defective units.

The present invention discloses materials which will permit the formation of the double panes of glass in a single continuous operation. The new material has the following characteristics:

1. good adherence to the glass in the range of temperatures corresponding to the temperatures to which the glass may be exposed in use.
2. a modulus of elasticity and plasticity which will maintain spacing of the panes of glass and which relieves the strain on the panels in the same temperature range.
3. impermeable to water vapor both in the joint itself and at the interface of the glass and the joint.
4. good resistance to the common chemical agents such as water, paint solvents, linseed oil and the detergents and cleaning agents used in painting and washing windows.
5. a viscosity curve which varies rapidly as a function of temperature, that is the material must be thermoplastic in a range which permits it to be applied to the glass in molten form and then rapidly hardened to permit the processing of the glass in a continuous line parade.

The resin previously proposed and the common hot-melt glues do not meet these requirements as they have poor adhesion to the glass, or do not have a viscosity coefficient which permits continuous operations, and the joints are insufficiently flexible to absorb the differences in expansion of the two sheets of glass.

The present invention has as an object an insulating thermal unit composed of a plurality of spaced glass sheets which are joined together at the edges by a blend of resins having a good adherence to the glass and which are water tight and which will maintain the spacing and water tightness over a wide range of temperature.

The present invention has as another object the production of a blend of resins which are thermoplastic at high temperature, not brittle at a temperature in the field of use, which have good adhesion to glass and which resist water vapor and common painting and cleaning agents.

The present invention has a still further object the process of producing double glass thermal panes on a continuous basis.

The present invention is based upon the discovery that a novel combination of an ionomer resin and a terpene ester will have characteristics meeting the requirements set forth above, while neither of these resins alone will satisfy the requirements.

The ionomer resins used in the combination are the material described in patents to Richard W. Rees in Canadian Pat. No. 674,595 and in U.S. Pat. No. 3,264,272.

The polymers are ionic copolymers of alpha-olefins having the formula R—CH=CH$_2$, where R is a radical selected from the class consisting of hydrogen and alkyl radicals having from 1 to 8 carbon atoms, and alpha-beta ethylenically unsaturated carboxylic acids having from 3 to 8 carbon atoms, said copolymers having from 10% to 90% of the carboxylic acid groups ionized by neutralization with metal ions uniformly distributed throughout the copolymer, said copolymer being a direct copolymer of the alpha olefin and the unsaturated carboxylic acid in which the carboxylic acid groups are randomly distributed over all molecules and in which (1) the alpha olefin content of the polymer is at least 50% based on the olefin acid copolymer, (2) the unsaturated carboxylic acid content of the polymer is from 0.2 to 25 mol percent based on the alpha olefin acid copolymer, and (3) any other monomer component optionally copolymerized in said copolymer is monoethylenically unsaturated, and the metal ions have an ionized valence of from one to three inclusive when the unsaturated acid is a monocarboxylic acid and an ionized valence of one when the acid is dicarboxylic and said metal ions being selected from the group consisting of uncomplexed and complexed metal ions, said ionic copolymers having solid state properties characteristic of crosslinked polymers and melt fabricability properties characteristc of uncrosslinked thermoplastic polymers.

When the term "ionomer" is used in this specification and claims it is intended to refer to the class of resin disclosed in Rees' patents. These resins as sold under the trademark "SURLYN" are copolymers of ethylene and acids such as acrylic acid. These resins are thermoplastic materials which contain at the same time covalent and ionic bonds. The base of the polymer will be the ethylene polymer with anionic bonds furnished by the acrylic acid, and cationic bonds supplied by the metal. The metals most often used are sodium, potassium, magnesium and zinc.

The ionic bonds in combination with the covalent bonds give a superior reticulation of the chains in the polymer and impart a better cohesion of the polymer and help the flow characteristics. The ionic bonds have polar groups which give better adhesion to glass and other materials having polar groups such as paint, and assure that paint will adhere to the surface. One of the difficulties of pure hydrocarbon resins is their inability to satisfactorily receive and retain paint. Thus these bonds are capable of relaxing and giving the polymers into which they are grafted a behavior which is comparable to that of the thermosetting resins at slightly elevated temperatures and yet are plastic at temperatures above 170° C.

It would be impossible to utilize the ionomer resins alone to constitute the joint of a double pane of glass having a space between the panes. Rees in U.S. Pat. No. 3,344,014 has proposed the production of safety glass in which a sheet of an ionic resin is sandwiched between two sheets of glass. This involves the heating of the glass and resin for long periods of time. While the ionomer may be used in this form alone it can not be used as a thermoplastic resin to form a double glazing unit. The temperature at which the ionomer resin becomes plastic is around 250° C. and this is too close to the temperature at which the resin is degraded to be used successfully. The joint lacks adequate working margin of temperature in application and does not have the requisite plastic qualities to form a permanent seal, at normal temperature.

The present invention includes blending the ionomer resin with a sufficient proportion of a terpene ester to reduce the temperature at which the resin can be worked to form the glazing unit. The blend of the ionomer resin and the terpene ester gives a material having the following properties:

1. an initial softening at a temperature below 100° C.
2. temperature of flowing in the neighborhood of 170° C.
3. a temperature of heat-gluing in the order of 170° to 200° C.

The preferred examples of a terpene ester to be used according to the invention is a colophany ester.

It is preferred to use a composition containing the following proportions in terms of percent by weight of the constituents:

Ionomer resin _____ 5–30
Colophany ester _____ 30–50
Adjuvants to make _____ 100

The blend overcomes the disadvantages which are imposed upon the joint by the differences in coefficient of expansion between the glass and the joint material. This adhesive material has a modulus of elasticity which will permit the two panels to be held strongly even if the temperature differences on the two sides of the panel are substantially different. This adhesive is capable of adjusting to the extremes of temperature.

A still further improvement in the characteristics of the basic combination is possible, especially in producing a more compatible coefficient of expansion by the addition of other thermoplastic materials or elastomers which are compatible with the ionomer used in the composition. Satisfactory joints have been made by the addition of copolymers of ethylene and vinyl acetates, such as are sold as "ELVAX" grade 220–240 and elastomers such as butyl rubber and polyisobutylene. These materials may constitute from 25 to 50% by weight of the composition.

A preferred composition would have the following composition in parts by weight

Ionomer resin _____ 5–30
Colophany ester _____ 30–50
Ethylene-acetate copolymer } _____ 25–50
Butyl rubber }
Adjuvants to make 100

The adjuvants may include well-known materials such as those increasing the instantaneous adhesive power e.g. the polyvinyl ethers such as "LUTONAL" (BASP), antioxidants such as 2-6-di-tertiobutyl-para-cresol (DALPAC 4c by Hercules) which are capable of slowing down the changes due to heating,
absorbents for ultra-violet rays such as 2-hydroxy-4-methoxybenzophenone (CIASORB),
dessicants such as silica gel, and
molecular sieves (4A of Linde)

The following three examples are given of desirable materials for forming the joint of the double glazing panels as indicated below, the proportions being given in weight percent.

| | | | |
|---|---|---|---|
| Resin ionomer "SURLYN" | 7 | 20 | 11 |
| Colophany resin "FORAL" | 30 | 50 | 50 |
| Butyl rubber | | | 37 |
| Ethylene-acetate copolymer (ELVAX) | 33 | 20 | 25 |
| Polyvinyl ether "LUTONAL" | 9 | 6.3 | 6.3 |
| Antioxidant "DALPAC" | 1 | 0.2 | 0.2 |
| Silica gel | 10 | 2.8 | 3.2 |
| Molecular sieve 4A | | 0.5 | 0.4 |
| Barium sulfate | 9 | | |

Briefly the compositions which have proven to be the best for the purposes expressed above correspond to the following conditions as expressed in weight percent.

Ionomer resin _____ 10–15
Colophany ester _____ 30–50
Ethylene-acetate copolymer _____ 10–30
Butyl rubber _____ 1–15
Adjuvants and fillers to make 100

An Example of the characteristics of the third product listed above gave the following properties:

Softening temperature _____ 80° C.
Temperature of application ____ 170° C.
Heat gluing temperature _____ 170–200° C.
Viscosity at 185° C. _____ 1000 poises
Density _____ 1.05
Resistance to shearing of glass-glass resin joint _____ 65 daN/cm.$^2$
Coefficient of Expansion _____ 15.10$^{-5}$
Permeability to water vapor (without absorbant) _____ 0.02 gm. mm./m.$^2$ (day)
Color clear brown The material is prepared by mixing the constituents at the temperature of use and then depositing the material at the heat gluing temperature between the edges of the two sheets of glass in the form of plastic thread or ribbon, which sets rapidly by cooling and thus glues together the sheets of glass and at the same time spaces the sheets and produces a water tight joint. The mixing of the constituents may be done in a softener of "WERNER" type after which the glue may be reheated and applied to the joint, or the ingredients can be mixed directly in a softener equipped with an Archimedes screw such as the "O'TOOL" type apparatus which can directly apply the heated glue to the joint.

The drawing illustrates the apparatus used in applying the joint to the glass sheets and shows one station in which:

FIG. 1 is a top plan view of the apparatus.
FIG. 2 is an end view of the apparatus.

The apparatus comprises a conveyor 1 which is mounted to convey the sheets of glass past a station at which the glue is applied. The two sheets of glass rest on the conveyor in assembled relation with lyre 3 separating the sheets of glass. Along one side of the conveyor are guiding ramps 4 to maintain the glass in fixed relation with the applicator 6 along the opposite side of the conveyor. The applicator 6 comprises an upper chamber 7 for receiving the glue or the glue constituents, a heating means 8 to maintain the glue at gluing temperature, a valve 9 to control the flow of the glue and a solenoid 10 to actuate the valve when a sheet is moving past the applicator and a nozzle 11 to feed a thread of glue between the sheets. As the hot glue contacts the sheets it will fill the gap between the sheets adjacent to the edges of the sheet. As the sheets pass the applicator the glue will be carried along with the sheet and will rapidly harden as the glue cools. From this station the sheet will pass to a similar station having the guide ramps and the applicator on the opposite side of the sheet to form an article having the two side edges glued together and supported in fixed spaced relation. The sheet can then be rotated at 90° before reaching a third station to glue the third side, and then to a fourth station to glue the final side. Prior to the fourth station the lyre 3 will be removed from the space between the glass sheets which are now held in fixed position by the hardened glue.

It is often advantageous to apply an aluminum ribbon to the outer edge of the sheet to protect the glue from contact with air and solvents. This ribbon can be fed to the sheet as it passes beyond the applicator for the glue so that the ribbon may be pressed into contact with hot soft glue so that it adheres to the joint.

This invention includes the making of a novel blend which is particularly adapted to the making of double panes of glass which are particularly useful as exterior windows in which the joint includes a resin which is operative to hold the sheets of glass apart as well as to form a water vapor tight joint.

Of course, similar panes could be made by using another method of laying the joint. The blend is applied on light metal sections; these sections are cut to the desired length and put in place between two sheets of glass, along the edges of said sheets, into a pack, which will be passed through an oven at about 170° C., then cooled again.

What is claimed is:

1. An insulating glass panel comprising two parallel sheets of glass spaced apart and enclosing a space, a joint about the peripheral area of the glass sheets, said joint being adhered to the sheets and serving to maintain the sheets in spaced relation, said joint comprising a blend of thermoplastic material containing a terpene ester and an ionomer resin.

2. An article of manufacture as set forth in claim 1 in which the blend also includes an ethylene-acetate copolymer.

3. An article of manufacture according to claim 1 in which the blend has a softening temperature of at least 80° C., a heat gluing temperature of from 170° to 200° C., a viscosity at 185° C. of 1000 poises, a density of about 1.05, and the joint has a resistance to heat of 65 daN/cm.$^2$ and a coefficient of expansion of about $15.10^{-5}$.

4. An article of manufacture according to claim 1 in which the joint has an aluminum ribbon attached to the joint.

5. An article of manufacture according to claim 1 in which the blend has the composition in parts by weight

| | |
|---|---|
| Ionomer resin | 5–30 |
| Colophany ester | 30–50 |
| Ethylene-acetate copolymer / Butyl rubber | 25–50 |
| Adjuvants to make 100. | |

6. An article according to claim 1 in which the ionomer resin is a copolymer of an alpha-olefin and an alpha-beta unsaturated acid, having 10% to 90% of the carboxylic acid groups neutralized with metal ions uniformly distributed throughout the copolymer, said ionomer resin having solid state properties characteristic of crosslinked polymers and melt fabricability properties characteristic of uncrosslinked thermoplastic polymers.

References Cited

UNITED STATES PATENTS

| | | | |
|---|---|---|---|
| 3,264,272 | 8/1966 | Rees | 260—78.5 T |
| 3,344,014 | 9/1967 | Rees | 161—203 |
| 2,275,812 | 3/1942 | Woelfel | 156—109 X |
| 3,097,061 | 7/1963 | Woelk | 156—109 X |

PHILIP DIER, Primary Examiner

U.S. Cl. X.R.

52—172; 156—109; 161—203; 260—78.5 T

UNITED STATES PATENT OFFICE
CERTIFICATE OF CORRECTION

Patent No. 3,822,172           Dated July 2, 1974

Inventor(s)    Robert Rullier

It is certified that error appears in the above-identified patent and that said Letters Patent are hereby corrected as shown below:

Column 2, line 26, delete "a" before "good".
Column 4, line 28, for "37" substitute --3.7--.
Column 6, line 14, for "heat" substitute --shearing--.

Signed and sealed this 26th day of November 1974.

(SEAL)
Attest:

McCOY M. GIBSON JR.
Attesting Officer

C. MARSHALL DANN
Commissioner of Patents